United States Patent
Young et al.

(10) Patent No.: US 7,129,928 B2
(45) Date of Patent: Oct. 31, 2006

(54) JOYSTICK CONTROLLER FOR CELLULAR TELEPHONE

(75) Inventors: Hoi L. Young, Monmouth Junction, NJ (US); Richard Thrush, Garwood, NJ (US)

(73) Assignee: Motorola Inc., Schaumburg, IL (US)

( * ) Notice: Subject to any disclaimer, the term of this patent is extended or adjusted under 35 U.S.C. 154(b) by 416 days.

(21) Appl. No.: 10/650,870

(22) Filed: Aug. 28, 2003

(65) Prior Publication Data

US 2005/0057501 A1    Mar. 17, 2005

(51) Int. Cl.
*G09G 5/08* (2006.01)
(52) U.S. Cl. .................... 345/161; 455/575.3
(58) Field of Classification Search ............... 345/161, 345/156, 169; 455/575.3, 556.1
See application file for complete search history.

(56) References Cited

U.S. PATENT DOCUMENTS

| | | | |
|---|---|---|---|
| 5,594,618 A * | 1/1997 | Sellers | 361/680 |
| 6,343,945 C1 | 2/2002 | Liikanen | |
| 6,433,777 B1 * | 8/2002 | Sawyer | 345/161 |
| 6,642,857 B1 * | 11/2003 | Schediwy et al. | 341/20 |
| 6,826,042 B1 * | 11/2004 | Oross et al. | 361/683 |
| 2004/0227732 A1 * | 11/2004 | Kemppinen | 345/161 |

* cited by examiner

*Primary Examiner*—Richard Hjerpe
*Assistant Examiner*—Stephen G Sherman
(74) *Attorney, Agent, or Firm*—Randall S. Vaas; Douglas S. Rupert

(57) ABSTRACT

A joystick that is retractable within a clam-shell style cellular telephone includes a base with a cavity and a flip hingedly attached to the base. A joystick is disposed in the cavity of the base and is moveable between an extended position and a retracted position by rotation of the flip with respect to the base.

14 Claims, 3 Drawing Sheets

JOYSTICK CONTROLLER FOR CELLULAR TELEPHONE

FIELD OF THE DISCLOSURE

This patent relates generally to control devices for cellular telephones, and particularly, to a retractable joystick for a cellular telephone.

BACKGROUND OF THE DISCLOSURE

As technology increases the capabilities of cellular telephones, consumers are demanding cellular telephones to perform more functions. These functions include text messaging, e-mailing, and, increasingly, gaming.

Present cellular telephones that are capable of playing games are simple spin-offs of existing form factor handsets. These cellular telephones incorporate a four-way directional input, i.e., up, down, left or right. This is adequate for games such as poker, or merely maneuvering through on-screen menus. However, as demand for gaming has grown and the complexity of games has increased, a need has developed for increased user input capabilities.

As can be seen in other video game consoles such as Sony Playstation® or X-Box®, a joystick is a common user input method. Games played on these systems are of higher complexity and require a far more precise directional control than a four way input. These joysticks include a multi-directional controller that can read any direction in which the rod is pushed, and the distance it has been pushed.

However, a joystick that could be used in a cellular telephones would have the problem of damage to the joystick. The joystick could easily be damaged if the user dropped the cellular telephone, due its protruding nature from the protection of the housing. The joystick could catch on items such as a jacket pocket while it was being transported. In particular, clam-shell style cellular telephones present a problem because they fold over themselves. A joystick extending upwards would make it impossible for a clam-shell style cellular telephone to close.

BRIEF DESCRIPTION OF THE DRAWINGS

The invention will become more fully understood from the following detailed description, taken in conjunction with the accompanying drawings.

DETAILED DESCRIPTION

Figure 1:
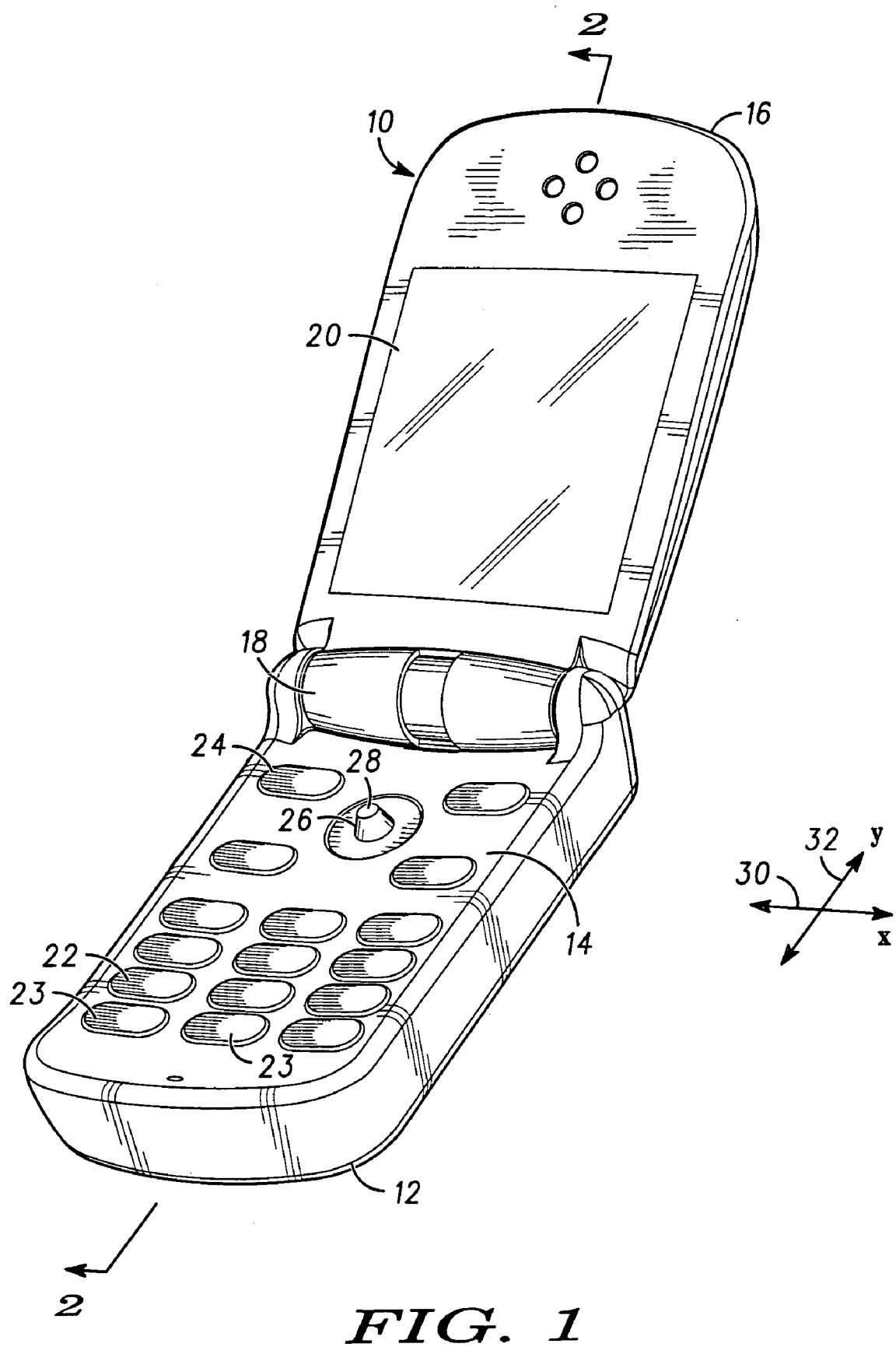
FIG. 1 is a perspective view of a cellular telephone with a retractable joystick.

FIG. 1 illustrates a cellular telephone 10 according to an example of this disclosure. Although in this specification a cellular telephone 10 is described, it is clear that any personal communication device, such as a pagers or wireless personal digital assistants could incorporate the teachings of this disclosure to advantageously increase the ability of a user to input information into the device.

As depicted in FIG. 1, the clam-shell style cellular telephone 10 includes a base 12 with a surface 14, and a flip 16 connected to the base 12 along a hinge section 18. A display screen 20 is disposed on the flip 16. A keypad 22 with individual keys 23, function keys 24, and a retractable joystick 26 are disposed on the base 12.

The display screen 20 provides a visual display of information to the user. This includes, for example, time and date, the phone numbers being called, and selectable menu items such as a personal phone book, phone numbers of recent calls, or video games played by the user of the cellular telephone 10.

The keypad 22 is used to input information into the cellular telephone 10 by pressing individual buttons 23. In one example of use, the keypad 22 can be used to enter a telephone number. The function keys 24 can also be used to enter information into the cellular telephone 10. The function keys 24 can perform various functions, such as ending a call, calling up a menu, or selecting an item from a menu.

The retractable joystick 26 can be used as a user input device to navigate through the menus shown on the display screen 20 and further can be used, as is well known, in the playing of video games. The joystick 26 can include a crown 28 that can be manipulated by the user such that the user can push the crown 28 in either a X direction 30, a Y direction 32 or a combination of both. The structure of a joystick 26 with multiple directional input capabilities is well known in the art, and will not be discussed herein.

Figure 2:
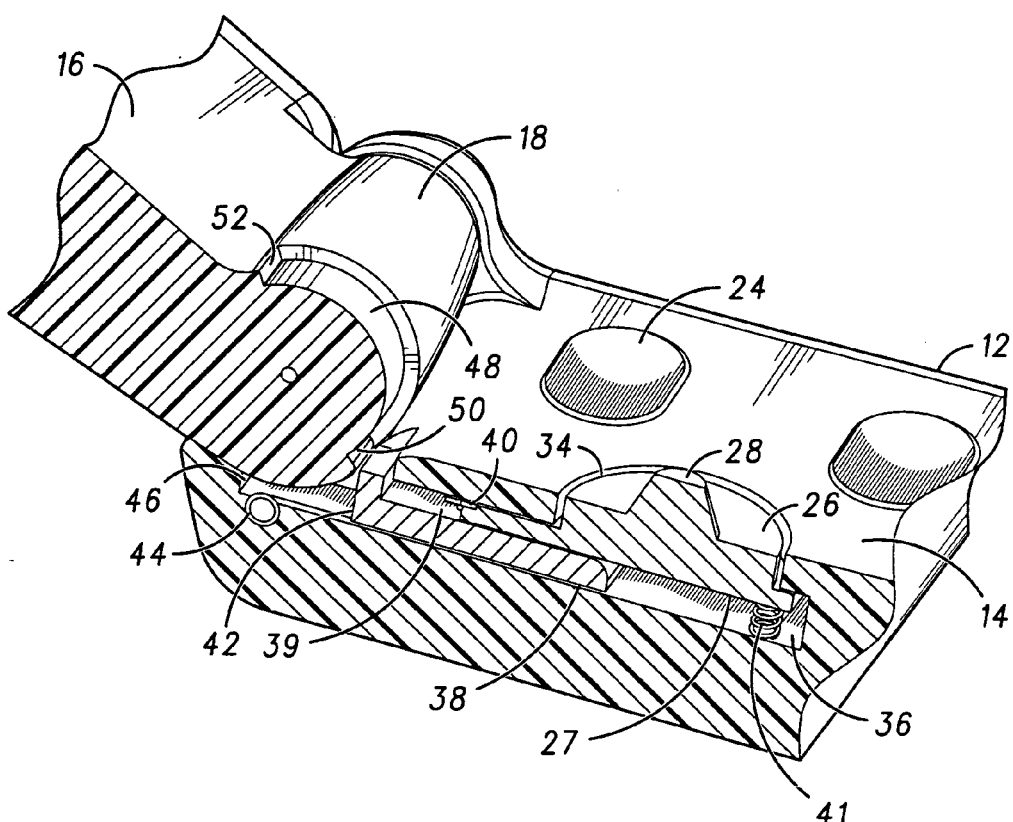
FIG. 2 is a fragmentary perspective cut-away view of the cellular telephone of FIG. 1 with the joystick in the extended position taken along line 2—2 in FIG. 1.

Referring now to FIG. 2, the base 12 includes an opening 34 in the surface 14 leading to a cavity 36 within the base 12. The joystick 26 and a lever 38 are disposed within the cavity 36. The joystick 26 is rotatably fixed within the cavity 36 along a hinge 40 and includes a bottom surface 27. The joystick 26 also may be pinned or use any other structure to rotatably fix the joystick 26 within the cavity 36 along the hinge 40 such that it may travel through the opening 34. As will be further seen, other structures and methods can be employed to allow the joystick 26 to move through the opening 34. A compression spring 41 is connected to the joystick 26 and the base 12 inside the cavity 36 and is configured to pull the joystick into the cavity 36.

The lever 38 includes a riser portion 42 and a top surface 39 and is configured to slide within the cavity 36 along a predefined path. A coil spring 44 exerts a force on the lever 38 such that the lever 38 is urged away from the joystick 26 and towards a back end 46 of the cavity 36.

The hinge section 18 of the flip 16 rotatably connects the flip 16 to the base 12. The hinge section 18 includes a channel 48 with a first shoulder 50 and a second shoulder 52. The first shoulder 50 is adapted to engage the riser 42 of the lever 38.

As shown in FIG. 2, the flip 16 has been rotated away from the base 12 such that the cellular telephone 10 is in a 'use position' and is available for a user to place a call. In the use position, the joystick 26 is in an extended position and may be accessed by a user. As the flip 16 is rotated to this position, the first shoulder 50 engages the riser 42 of the lever 38 and pushes the lever 38 towards the joystick 26. The top surface 39 of the lever 38 engages the bottom surface 27 of the joystick 26 such that the surfaces 27 and 39 raise the joystick 26 into the extended position. The joystick 26 is supported in the extended position by the lever 38. As shown in FIG. 2, the joystick 26 is caused to rotate around the hinge 40 to be raised into the extended position; however, the joystick 26 may also be arranged to translate linearly through the opening 34.

Figure 3:
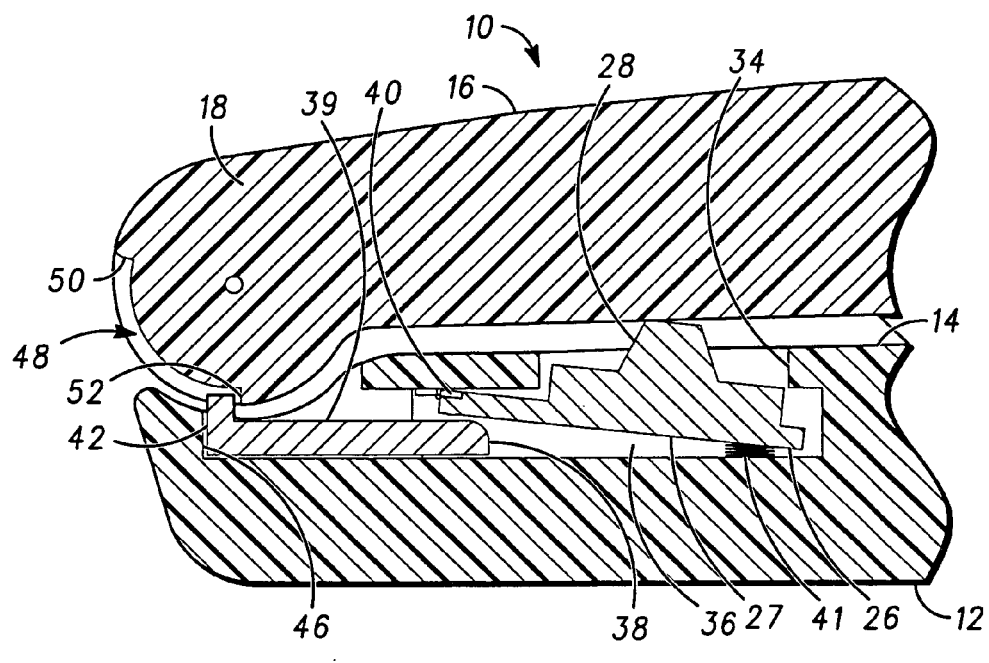
FIG. 3 is a fragmentary cross-sectional view of the cellular telephone of FIG. 1 with the joystick in the retracted position, taken along line 2—2 in FIG. 1.

After the user is finished using the cellular telephone 10, the user can rotate the flip 16 towards the base 12 to place the cellular telephone 10 in a 'store position,' as shown in FIG. 3. As the flip 16 and base 12 are rotated together to the store position, the first shoulder 50 is rotated away from the riser 42 of the lever 38, and the coil spring 44 pulls the lever 38 away from the joystick 26. The riser 42 is ultimately disposed against the back wall 46 of the cavity 36, and the channel 48 travels past it until the flip 16 and base 12 reach the store position. In this position, the lever 38 has been pulled out from under the joystick 26, disengaging the surfaces 27 and 39, and the joystick 26 is no longer supported by the lever 38. The joystick 26 is pulled into the cavity 36 by the compression spring 41 to the retracted position as shown in FIG. 3, where the crown 28 cannot damage the flip 16, and vice versa.

Figure 4:
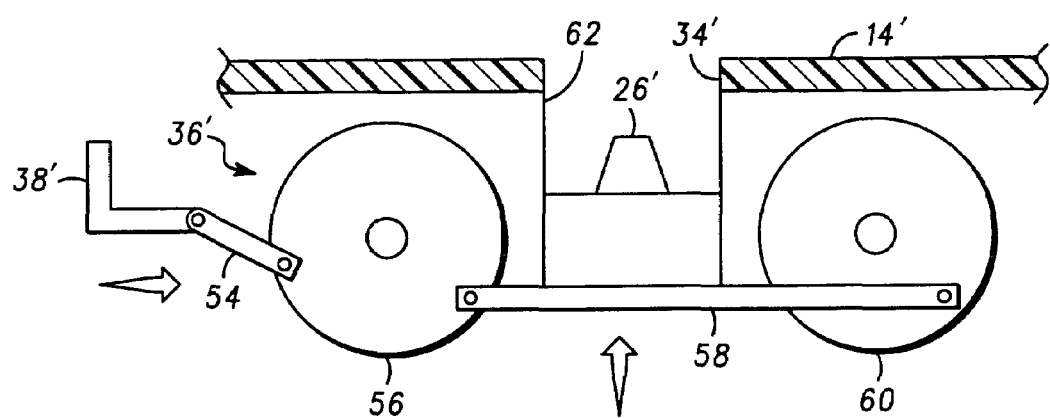
FIG. 4 is a fragmentary view of alternative structure to extend and retract the joystick within the cellular telephone of FIG. 1.
Figure 5:
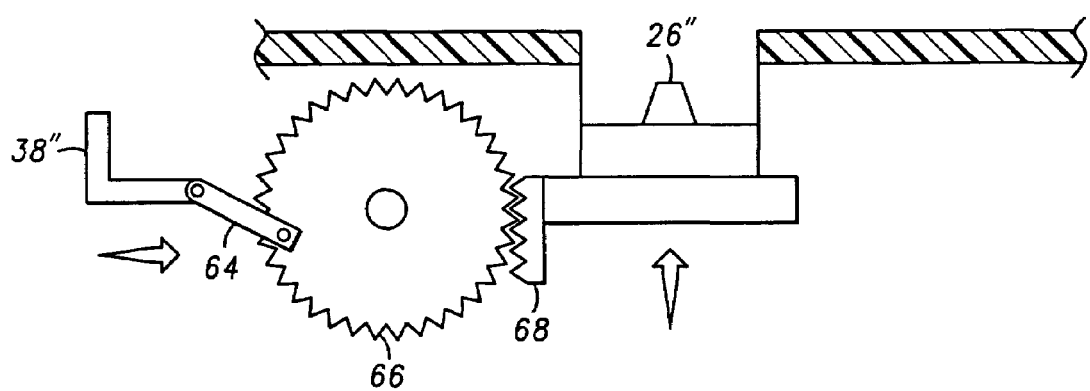
FIG. 5 is a fragmentary view of alternative structure to extend and retract the joystick within the cellular telephone of FIG. 1.

Other structures, such as those depicted in FIGS. 4 and 5, can be employed to convert the rotational motion of the flip 16 relative to the base 12 to the vertical motion of a joystick 26'. In FIG. 4, the lever 38' is connected to a first linkage rod 54. The first linkage rod 54 is connected to a first disk 56, then to a second linkage rod 58, and finally to a second disk 60. The second linkage rod 58 is connected to a joystick 26'. As flip 16 and the base 12 are rotated away from each other, the lever 38' is pushed toward the joystick 26', and the two disks 56, 60 are rotated by the first and second linkage rods 54, 56. This lifts the second linkage rod 58, and thereby lifts the joystick 26' up through the opening 34'. In this example, a seal 62 is disposed between the surface 14' and the joystick 26' which inhibits the entrance of debris into a cavity 36' through a opening 34'.

In the example shown in FIG. 5, a first linkage rod 64 is connected to a pinion gear 66. A joystick 26" is connected to a rack 68. As a lever 38" is pushed toward the joystick 26", the pinion gear 66 is rotated, thereby moving the rack 68 and the joystick 26" in the vertical direction, thus raising the joystick 26" as the flip 16 is rotated away from the base 12.

In other examples not shown, other systems can be used to raise and lower the joystick. These systems include electrical, electromechanical, hydraulic, pneumatic, or combinations thereof, in which the rotational movement of the flip relative to the base signals or causes the joystick to extend or retract.

While the detailed drawings, specific examples and particular formulations given describe exemplary embodiments, they serve the purpose of illustration only. The systems shown and described are not limited to the precise details and conditions disclosed. It is clear that the disclosed are merely examples of mechanical systems that convert the rotational motion of the flip to the vertical motion of the joystick. Other systems could easily be implemented without departing from the scope of this disclosure. Further, other input devices, for example a trackball, could easily be used as an input device for the personal communication device. Other substitutions, modifications, changes, and omissions may be made in the design, operating conditions, and arrangement of the exemplary embodiments without departing from the scope of the invention as expressed in the appended claims.

We claim:

1. A cellular telephone, comprising:
    a base with a cavity;
    a flip hingedly attached to the base;
    a joystick disposed in the cavity of the base, wherein the joystick is moveable from an extended position to a retracted position by rotating the flip with respect to the base;
    a lever adapted to support the joystick in the extended position; and
    wherein the flip includes a hinged portion includes a first shoulder adapted to engage the lever during rotation of the flip.

2. The cellular telephone of claim 1, wherein the joystick is unsupported by the lever in the retracted position.

3. The cellular telephone of claim 1, wherein the lever is adapted to be forced under the joystick.

4. The cellular telephone of claim 1, wherein a spring urges the lever away from the joystick.

5. The cellular telephone of claim 1, the hinged portion further comprising a second shoulder adapted to maintain the lever away from the joystick.

6. The cellular telephone of claim 1, further comprising a seal between the joystick and the base such that debris is inhibited from entering the cavity.

7. The cellular telephone of claim 1, the joystick including a pivot axis about which the joystick rotates between the retracted position and the extended position.

8. A cellular telephone, comprising:
    a base with a cavity;
    a flip hingedly attached to the base;
    a joystick disposed in the cavity of the base, wherein the joystick is moveable from an extended position to a retracted position by rotating the flip with respect to the base; and
    a lever adapted to support the joystick in the extended position, wherein the lever is attached to a linkage rod.

9. A cellular telephone, comprising:
    a base with a cavity;
    a flip hingedly attached to the base;
    a joystick disposed in the cavity of the base; and
    means for moving the joystick between an extended position and a retracted position by rotation of the flip with respect to the base wherein the means include a lever such that the joystick is supported by the lever in the extended position and is unsupported by the lever in the retracted position, and wherein the means include a hinged portion on the flip, the hinged portion including a first shoulder adapted to engage the lever during rotation of the flip.

10. The cellular telephone of claim 9, wherein the lever is adapted to be forced under the joystick.

11. The cellular telephone of claim 9, wherein the means includes a spring that urges the lever away from the joystick.

12. The cellular telephone of claim 9, wherein the joystick includes a pivot axis about which the joystick rotates between the retracted position and the extended position.

13. The cellular telephone of claim 9, further comprising a seal between the joystick and the base such that debris is inhibited from entering the cavity.

14. A cellular telephone, comprising:
    a base with a cavity;
    a flip hingedly attached to the base;
    a joystick disposed in the cavity of the base; and
    means for moving the joystick between an extended position and a retracted position by rotation of the flip with respect to the base wherein the means include a lever such that the joystick is supported by the lever in the extended position and is unsupported by the lever in the retracted position, wherein the means includes a linkage rod attached to the lever.

* * * * *